US006874983B2

(12) United States Patent
Moerke et al.

(10) Patent No.: US 6,874,983 B2
(45) Date of Patent: Apr. 5, 2005

(54) ERGONOMIC FASTENER

(75) Inventors: Benjamin H. Moerke, Chippewa Falls, WI (US); James T. Kirchen, Chippewa Falls, WI (US); Mark W. Severin, Eau Claire, WI (US)

(73) Assignee: Illinois Tool Works Inc., Glenview, IL (US)

( * ) Notice: Subject to any disclaimer, the term of this patent is extended or adjusted under 35 U.S.C. 154(b) by 15 days.

(21) Appl. No.: 10/379,293

(22) Filed: Mar. 4, 2003

(65) Prior Publication Data

US 2003/0194288 A1 Oct. 16, 2003

Related U.S. Application Data

(60) Provisional application No. 60/371,951, filed on Apr. 11, 2002.

(51) Int. Cl.⁷ ............................................. F16B 13/06
(52) U.S. Cl. ........................... 411/46; 411/41; 411/508; 24/297
(58) Field of Search .................. 411/41, 45–48, 411/508, 913; 24/289–297

(56) References Cited

U.S. PATENT DOCUMENTS

| 3,869,958 | A | * | 3/1975 | Murayama | 411/15 |
|---|---|---|---|---|---|
| 4,610,587 | A | * | 9/1986 | Wollar et al. | 411/80.1 |
| 4,878,791 | A | * | 11/1989 | Kurihara et al. | 411/55 |
| 5,007,779 | A | * | 4/1991 | Goran | 411/48 |
| 5,030,051 | A | * | 7/1991 | Kaneko et al. | 411/55 |
| 5,387,065 | A | * | 2/1995 | Sullivan | 411/48 |
| 5,775,860 | A | | 7/1998 | Meyer | 411/46 |
| 6,039,523 | A | * | 3/2000 | Kraus | 411/48 |
| 6,048,147 | A | | 4/2000 | Arisaka et al. | 411/48 |
| 6,074,144 | A | | 6/2000 | Meyer | 411/41 |
| 6,533,515 | B2 | * | 3/2003 | Meyer | 411/45 |
| 6,691,380 | B2 | * | 2/2004 | Vassiliou | 24/295 |

FOREIGN PATENT DOCUMENTS

EP         0 450 820 A1      10/1991

* cited by examiner

*Primary Examiner*—Robert J. Sandy
*Assistant Examiner*—Ruth C. Rodriguez
(74) *Attorney, Agent, or Firm*—Mark W. Croll; Paul F. Donovan

(57) ABSTRACT

A fastener for securing a panel to a substrate is herein disclosed. The fastener has a body portion that is received in a substrate and a pin portion that is passed through a panel and driven into the body portion to secure the panel to the substrate. The body portion has a pair of legs that act to retain the body portion within the substrate and which incorporate an interference control mechanism that controls the force required to insert the pin portion of the fastener into the body portion. The interference control mechanism may include a bore formed through a leg of the body portion, a reduced cross-sectional area formed adjacent the base of a leg at the fastener, or an elastomeric member molded into the base of a leg of the fastener.

14 Claims, 3 Drawing Sheets

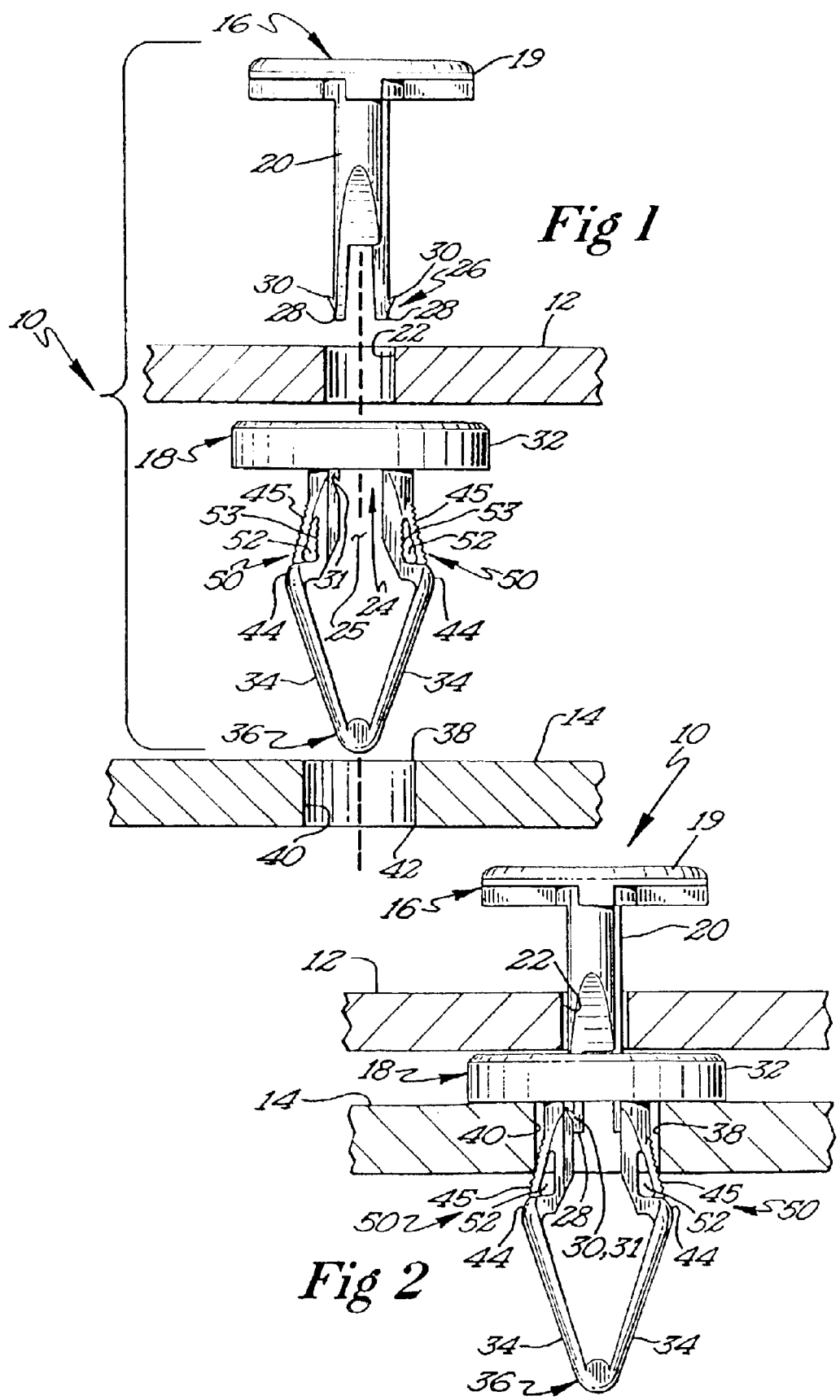

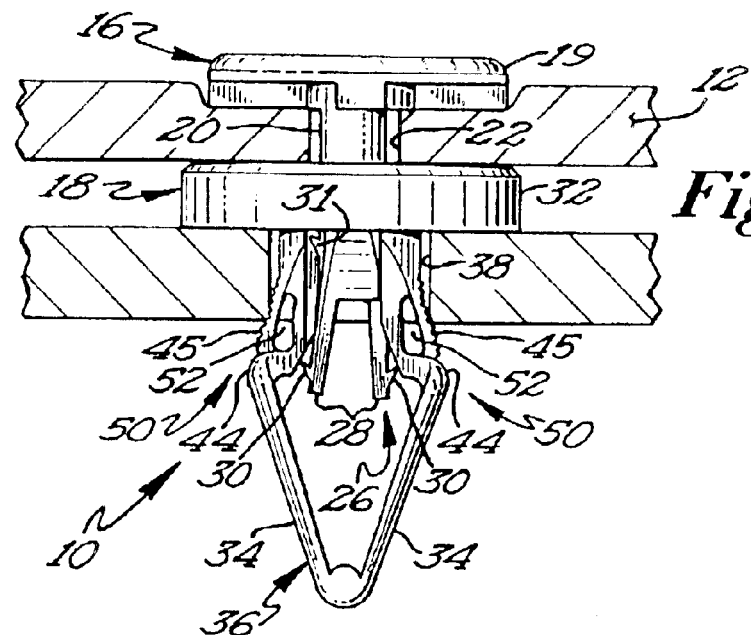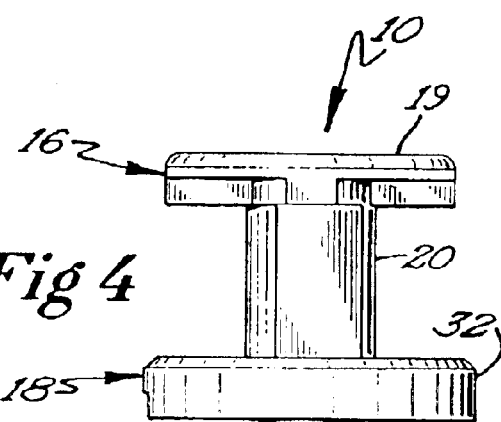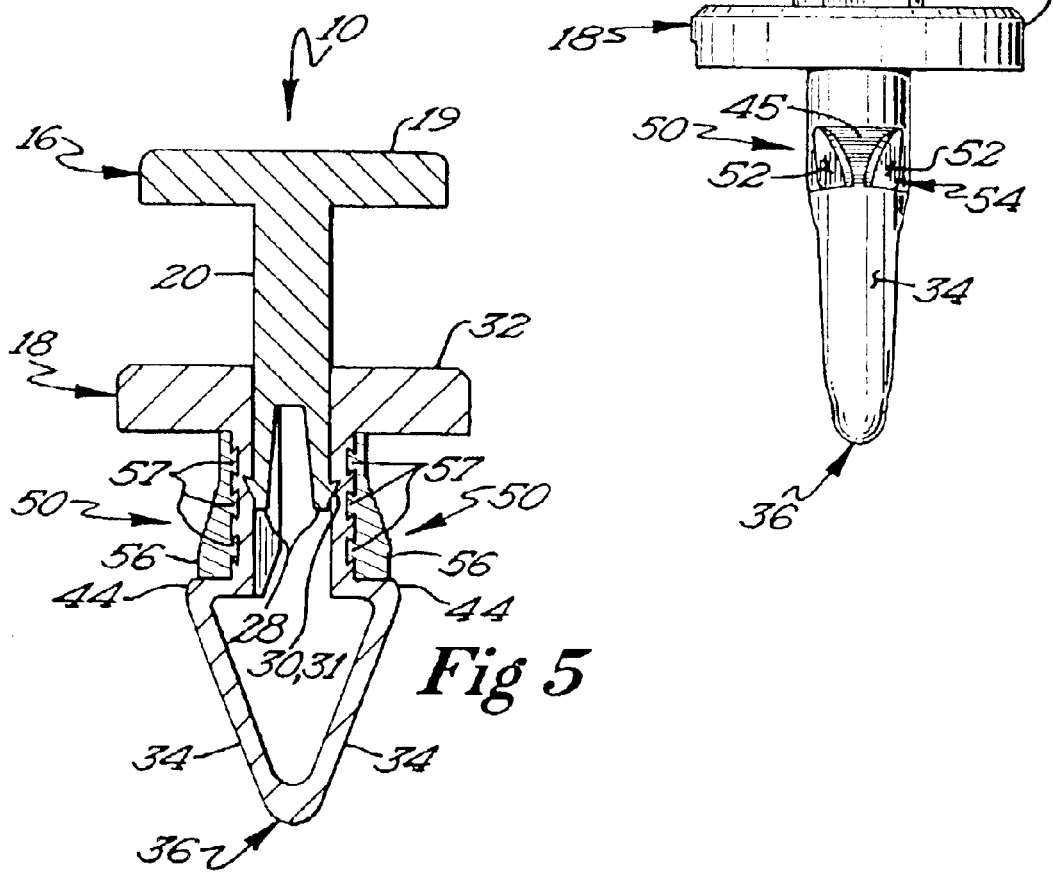

ERGONOMIC FASTENER

CROSS REFERENCE TO RELATED APPLICATIONS

This application claims the benefit of U.S. Provisional Application Ser. No. 60/371,951 filed on Apr. 11, 2002.

FIELD OF THE INVENTION

The present invention relates to a rivet-type fastener adapted to accommodate variance in hole size or panel thickness in order to ease the installation thereof.

BACKGROUND OF THE INVENTION

Rivet-type plastic fasteners are widely used as they are easy to install, perform well under shear and tensile loading, are serviceable, and can be used throughout a range of panel thicknesses. This type of fastener typically consists of a pin portion that is inserted into a body portion, the body portion being received in a hole formed through a substrate. In driving the pin portion into the body portion, the pin portion will capture a panel or other object between a head thereof and the body portion of the fastener. Typically, both panels are retained under the body head.

One disadvantage of a rivet-type fastener is that the effort required to drive the pin portion into the body portion is extremely dependent on the thickness of the panel in which the body portion is received and/or on the size of the hole within which the body portion is received. Small changes in the hole size or panel thickness can have a disproportionately large effect on the effort required to install the part. This relationship is particularly significant in light of safety-driven ergonomic requirements that mandate reduced installation forces for this type of fastener that can be as low as ten (10) pounds of force. Note that ergonomic requirements can vary from application to application. Accordingly, there is a recognized need to provide a rivet-type fastener that can accommodate variance in the size of the hole and thickness of panel into which it is installed. In addition to satisfying safety and ergonomic requirements, a fastener according to the present invention may be used in a greater number of disparate settings, thereby requiring fewer fasteners of differing size or style in a given assembly.

SUMMARY OF THE INVENTION

The objects of the present invention are realized in a rivet-type fastener that comprises a pin portion that is constructed and arranged to be received within a body portion. The body portion comprises a flange from which depend a pair of legs that may or may not be connected at their distal ends. A channel is formed through the flange of the body portion and passes between the legs thereof. The pin portion of the fastener has a head from which extends a shank. The shank is constructed and arranged to be received within the channel formed into the body portion such that as the shank is driven into the channel in the body portion, the legs of the body portion will be forced outwardly.

When the body portion is received in an aperture or bore formed through a substrate such as an automobile frame, inserting the shank of the pin portion into the bore formed through the body portion will drive the legs outwardly into compressive contact with the interior and edges of the aperture formed through the substrate to secure the fastener therein. It is to be understood that the shank and the cooperating bore formed in the body portion may take any shape that will result in the shank forcing the legs of the body portion outwardly into contact with the bore in which it is received.

One embodiment of the body portion includes a bore formed between the legs that is tapered inwardly from the head of the body portion towards the distal end of the legs such that the shank will necessarily force the legs outwardly into contact with a bore in which the body portion is received. Another embodiment of the body portion involves constructing the legs thereof such that as the legs are inserted into a bore in a panel, the legs are biased inwardly toward one another. The subsequent insertion of the shank into the bore between the legs drives the legs outwardly into contact with the bore in which the body portion is received. An interference control mechanism is incorporated into at least one of the legs of the body portion of the fastener so as to control the force required to insert the pin portion of the fastener into the body portion of the fastener.

The interference control mechanism preferably reduces the compressive strength of the leg or legs of the body portion of the fastener where they address the interior surface of the aperture into which the body portion has been received. By lowering the compressive strength of the leg where it addresses the interior of the aperture within which the body portion of the fastener is received, the pin portion of the fastener can be more easily driven into the body portion. In one preferred embodiment, the force required to drive the pin portion of the fastener into the body portion thereof will be equal to or less than 10 pounds of force.

The interference control mechanism may comprise a single feature, or a combination of multiple features. In one embodiment, the interference control mechanism comprises a bore or core formed transversely through the leg of the body portion of the fastener where the leg addresses the interior of the aperture into which the body portion has been received. This transverse bore removes material from the leg at this location and therefore makes it easier to compress that portion of the leg against the interior of the aperture formed through the substrate. This has the effect of lowering the amount of force required to drive the pin portion of the fastener into the body portion thereof. In a preferred embodiment, the transverse bore or core formed through the leg will have a smooth interior surface. However, in order to prevent unwanted deformations in the leg, it may be desirable to provide the interior surfaces of the transverse bore with interlocking teeth that prevent relative motion between the respective inner surfaces of the transverse bore formed through the leg.

Another embodiment of the interference control mechanism comprises a reduction in the cross-sectional area of the leg where it addresses the interior surface of the aperture into which the body portion of the fastener is received. The reduction in the cross-sectional area of the leg at this point reduces the compressive strength of the leg at this portion and thereby lowers the amount of force required to insert the pin portion of the fastener into the body portion thereof. Note that as an adjunct or alternative to reducing the cross-sectional area of the leg, the interference control mechanism may comprise a complex cross-sectional shape that has a lower compression strength than a simple, solid cross-section shape. Accordingly, regardless of whether the actual cross-sectional area of the interference control mechanism portion of the leg is different from that of the remainder of the leg, the interference control mechanism may comprise many different shapes that either by themselves, or in combination with a reduction in the cross-sectional area of the leg, act to reduce the compressional strength of the leg.

Yet another embodiment of the interference control mechanism comprises an elastomeric member that is formed into the leg at a location where it will engage the interior surfaces and edges of the aperture through the substrate into which the body portion of the fastener is received. The elastomeric material will typically have a lower compressive strength than the material from which the remainder of the body portion of the fastener is fashioned, thereby lowering the force required to seat the pin portion of the fastener within the body portion thereof. The elastomeric member may be formed in a two-shot molding process or in an over-molding process. Preferably the leg will be provided with some sort of mechanical key structure such that the elastomeric member will be mechanically secured to the leg itself.

While the preferred embodiments of the interference control mechanisms reduce the compression strength of the leg so as to reduce the force required to drive the pin portion of the fastener into the body portion thereof, it is to be understood that the interference control mechanism may be adapted to as to actually increase the compression strength of the leg, and thereby increase the force required to drive the pin portion of the fastener into the body portion thereof. As can be readily understood, the interference control mechanism of this embodiment may include an increase in the cross-sectional area of the leg, a modification of the shape of a leg that increases the compressional strength of the leg, or the provision of a non-elastomeric member having a higher compressional strength than the material of the remainder of the leg.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DESCRIPTION OF THE DRAWINGS

FIG. 1 is an exploded side view of a fastener of the present invention;

FIG. 2 is a side view of the present invention showing the body portion of the fastener received within a panel and the pin portion of the fastener partially inserted into the body portion;

FIG. 3 is a side view of a fastener of the present invention in a fully installed arrangement;

FIG. 4 is a plan view of a partially assembled fastener of the present invention; and, FIG. 5 is a vertical cross-section of a fastener of the present invention having an elastomeric section in its body portion.

DETAILED DESCRIPTION

Figure 6:
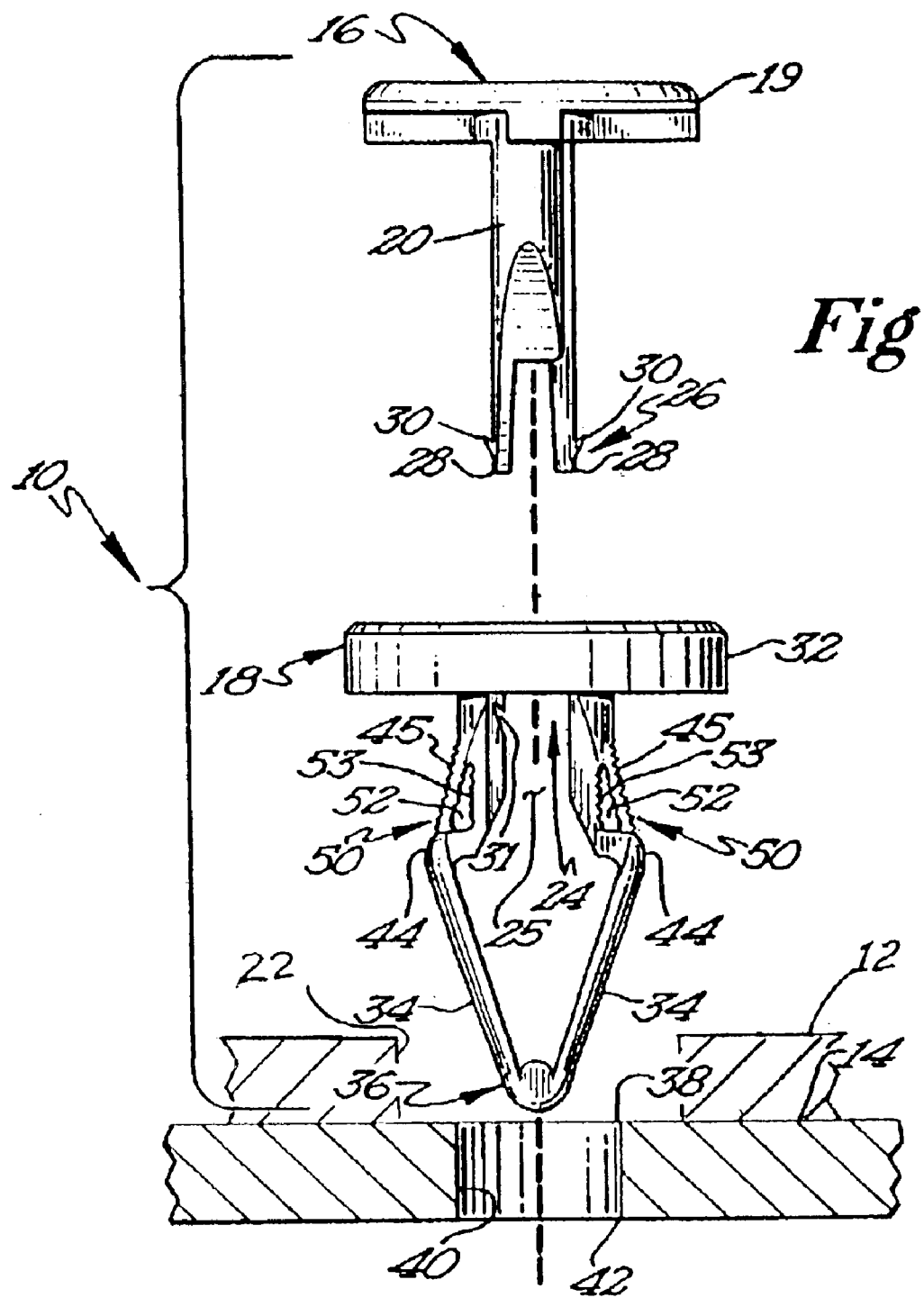
FIG. 6 is an exploded side view of the fastener of FIG. 1 showing the panel in an alternative position.

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

FIG. 1 illustrates the fastener 10 of the present invention in relation to a panel 12 that is to be secured to a substrate 14 that is typically the sheet metal framework of an automobile. The fastener 10 comprises a pin 16 that may be inserted into a body 18 in order to secure the panel 12 to the substrate 14.

The pin 16 of the fastener 10 comprises a head 19 from which extends a shaft 20. Typically the shaft extends perpendicularly from the head 19 of the pin 16, though it is to be understood that the shaft 20 of the pin 16 may extend from the head 19 thereof at any useful angle. A distal end 26 of the shaft 20 preferably has one or more flexible tabs 28 extending therefrom, though it is to be understood that the flexible tabs 28 are themselves optional. These tabs 28 are generally aligned with the shaft 20. Each of the flexible tabs 28 has a hook member 30 extending laterally therefrom. These hook members 30 act to retain the shaft 20 within a bore 24 formed through the body 18 of the fastener 10.

The body 18 generally comprises a head 32 from which extends a pair of legs 34. While in the preferred embodiment illustrated in FIG. 1 the distal ends 36 of the legs are connected to one another, these legs 34 may remain separate without affecting the function of the fastener 10. The legs 34 of the base 18 are adapted to be received within an aperture or bore 38 formed through the substrate 14. The aperture 38 has an inner surface 40 and a lower edge 42. Although panel 12 is shown between head 19 of pin 16 and head 32 of body 18, it should be understood that panel 12 may be positioned adjacent substrate 14 and below the head 32 of body 18 according to the principles of the present invention. FIG. 6 illustrates the fastener 10 of FIG. 1 with the panel 12 positioned against the substrate 14.

FIG. 2 illustrates the body 18 received within the aperture 38 formed through the substrate 14. In order to insert the body 18 into the aperture 38, the legs 34 must flex inward toward one another. As can be seen in the FIGS., the legs 34 preferably comprise a retaining mechanism 44 that acts to prevent the removal of the body 18 of the fastener 10 from the aperture 38 in which it is received. The legs 34 of the body 18 must flex inwardly in order to permit the retaining mechanism 44 to move through the aperture 38. The resilient nature of the legs 34 move the retaining mechanisms 44 to their retention position as shown in FIG. 2 once the legs 34 have been received through the aperture 38. The retention mechanism 44 in the present invention comprises a simple projection of the legs 34. However, it is to be understood that various other types of retention mechanisms, including flexible fingers, frustoconical vanes, or simple detents, could be utilized in place of the projection illustrated in FIGS. 1 and 2. What is more, while the retention mechanisms 44 are useful in assembling the body 18 with a substrate 14, the retention mechanisms 44 are not necessary as will be described in more detail below.

FIG. 2 illustrates the pin 16 as having been passed through the bore 22 in the panel 12 and partially into the bore 24 formed through the body 18. The bore 24 passes through the head 32 of the body 18 and between the legs 34 such that when the shaft 20 of the head of the pin 16 is inserted thereinto, the shaft 20 will be positioned between, and substantially aligned with, the legs 34. As can best be seen in FIG. 2, the hook member 30 of the flexible tab 28 is adapted to engage a depression 31 formed on an inner surface of the leg 34. By engaging the hook members 30 of the pin 16 in the depressions 31 formed in the legs 34 of the body 18, the fastener 10 can be preassembled for shipment, or may be preassembled with a panel 12 so that a panel 12, complete with the fasteners 10 needed to secure it to a substrate 14 may be assembled and shipped in toto to a remote assembly location.

As the pin 16 is driven fully into the bore 24 formed through the flange 32 of the body 18, the shaft 20 forces the legs outwardly into contact with the interior surface 40 and lower edge 42 of the aperture 38 formed through the substrate 14. In doing so, the shaft 20 of the pin 16 securely locks the body 18 into the aperture 38 through the substrate 14. Note that the space between the legs 34 defines a channel 25 into which the shaft 20 of the pin 16 is received. The legs 34 are fashioned so that the shaft 20 will necessarily force the legs 34 of the body 18 outwardly. In a preferred embodiment, the channel 25 tapers from the head of the body 18 toward the distal end of the legs 34. In this way, as the pin 16 is driven into the body 18, the legs 35 are forced outwardly. In another embodiment, the legs 34 are formed somewhat oversized with respect to the aperture 38 such that when the legs 34 of the body 18 are inserted into the aperture 38, the legs 34 are forced together, thereby obscuring the channel 25 formed therebetween. The subsequent insertion of the pin 16 into the channel 25 drives the legs 34 outwardly.

In forcing the shaft 20 into the channel 25, the material that makes up the legs 34 is compressed and/or deformed by the outward pressure created by the interaction of the shaft 20 with the legs 34 and securely engages the interior surface 40 and lower edge 42 of the aperture 38 formed through the substrate 14. It is this compression force that is primarily responsible for the fastener's 10 holding power and which renders the retention mechanisms 44, described above, optional. Because the compression strength of the material of the leg 34 is directly related to the amount of force that must be applied to the pin 16 in order to seat the shaft 20 within the channel 25, the legs 34 of the fastener 10 are provided with an interference control mechanism 50. The purpose of the interference control mechanism 50 is to modify the compressive strength of the material of the legs 34 and to thereby control the amount of force required to fully seat the pin 16 within the body 18 as shown in FIG. 3.

The interference control mechanism 50 of the fastener 10 typically acts to lower the compressive strength of the material of the legs 34 at that location where the legs 34 engage the aperture 38 formed through the substrate 14. However, it is to be understood that in certain circumstances, an interference control mechanism may be adapted to increase the compressive strength of the material of the legs 34 in order to increase the force necessary to seat the pin 16 within the body 18. Means for increasing the compressive strength of the leg 34 at the interference control mechanism 50 may include increasing the leg's cross-sectional area, changing the shape of the cross-section of the leg, or replacing a portion of the leg 34 with a material that is more compression resistant than the material of the remainder of the leg 34.

FIG. 1 illustrates a fastener 10 that incorporates two separate embodiments of an interference control mechanism 50. The first embodiment of the interference control mechanism 50 comprises a cored-out section or bore 52 that reduces the compressive strength of the legs 34 in a lateral direction at the position upon the legs where the legs 34 engage the aperture 38 formed through the substrate 14. By removing material from the legs 34, the bores 52 reduce the amount of force needed to compress or deform the legs 34 to achieve a desirable insertion force that is required to insert the pin 16 within the body 18.

In order to maintain the shape and holding power of the body 18, the bore 52 may be provided with teeth 53 on the opposed inner surfaces of the bore 52 as can be seen in FIG. 1. The teeth 53 prevent relative motion between the portions of the leg 34 to either side of the bore 52 and thereby maintain the structural integrity of the body 18.

Similarly, another embodiment of an interference control mechanism 50 reduces the amount of material present in the legs 34 by reducing the cross-sectional area of the legs as can be best seen in FIG. 4 at 54. The cross-sectional area of the legs 34 at the interference control mechanism 50 may take any useful shape so long as the compressive strength of the interference control mechanism 50 provides the desired insertion force for the pin 16. Note that ridges 45 may be formed into the legs 34 as part of retention mechanisms 44.

Yet another embodiment of the interference control mechanism 50 is illustrated in FIG. 5. In this embodiment, an elastomeric member 56 that is in general more resilient than the material from which the remainder of the fastener 10 is fashioned is emplaced on the legs 34 so as to engage the aperture 38 formed through the substrate 14. The elastomeric member 56 may be formed on the leg in a two shot molding process wherein the elastomeric member 56 is molded onto the fastener 10 immediately after the fastener 10 has itself been molded, through an over-molding process wherein an already molded fastener 10 has an elastomeric member 56 added after the fact, or by simply attaching a suitable, pre-existing elastomeric member 56 to the legs 34. The legs 34 are preferably provided with key structures 57 that extend therefrom that allow the elastomeric member 56 to be mechanically bonded to the legs. The elastomeric member 56 permits the legs 34 to move outwardly into contact with the aperture 38 easier that if the legs 34 were solid, thereby reducing the force required to insert the pin 16 into the body 18.

In FIGS. 1–4, the interference control mechanism 50 is illustrated as encompassing both a bore 52 and a reduced cross-section 54. It is to be understood that the fastener 10 of the present invention may incorporate any combination of a bore 52, a reduced cross-section 54, and an elastomeric member 56. That is to say, the bore 52, reduced cross-section 54, and elastomeric member 56, may be used alone or in combination with one another.

As can be appreciated from the figures, the use of an interference control mechanism 50 in a fastener 10 can allow one to specify a very precise insertion force for the pin 16. The proper specification of an interference control mechanism can reduce the insertion force required to seat the pin 16 within the body 18 to as low as ten pounds of force or less.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A fastener for securing a panel to a substrate, the fastener comprising:
    a pin portion having a head from which extends a shank;
    a body portion, the body portion having a head from which extends a pair of outwardly expandable resiliently flexible legs, the legs being separated by an axially extending slot and being constructed and arranged for insertion into a bore formed in the substrate, an integrally formed flexible hinge portion connecting the free end of the legs, the head itself having a bore formed therethrough, such that the bore in the head is in communication with the slot between the pair of legs, and the bore in the head and slot between the legs are arranged to receive the shank of the pin portion therein so that as the shank is forced into the slot, the pair of legs are forced away from one another and into compressive contact with an interior surface of the bore formed through the substrate so as to secure the fastener, and subsequently the panel, to the substrate; and, an interference control mechanism formed as part of the exterior of at least one of the legs of the body portion of the fastener adjacent a base of the at least one leg of the body portion, the interference control mechanism acting to control the compressive strength of the at least one leg so as to limit the compressive contact between the at least one leg and the interior surface of the bore formed through the substrate, thereby controlling a required insertion force that must be applied to the pin portion of the fastener to set the pin portion within the body portion of the fastener, wherein the interference control mechanism is configured and arranged to address the interior surface of the bore formed through the substrate within which the body portion of the fastener is received, and wherein the interference control mechanism comprises a bore formed transversely through the at least one leg, the bore of the interference control mechanism acting to reduce the compressive strength of the leg in such a manner as to reduce the compressive force required to drive the shank of the pin portion into the bore formed through the body portion of the fastener.

2. The fastener of claim 1 wherein the required insertion force that must be applied to the pin portion of the fastener to seat the pin portion within the body portion of the fastener is 10 pounds of force or less.

3. The fastener of claim 1 wherein the interference control mechanism comprises an area of reduced cross-sectional area of the at least one leg, the reduced cross-sectional area reducing the compression strength of the at least one leg so as to reduce the required insertion force that must be applied to the pin portion the fastener to seat the pin portion within the body portion of the fastener.

4. The fastener of claim 1 wherein the shank of the pin portion of the fastener further comprises at least one resilient tab extending from a distal end of the shank of the pin portion, the at least one resilient tab having a hook member extending laterally therefrom, the hook member of the at least one resilient tab being constructed and arranged to engage a complementary structure formed in the body portion of the fastener.

5. The fastener of claim 4 wherein at least one leg of the body portion of the fastener has a detent formed therein that mates with the hook member of the at least one resilient tab extending from the distal end of the shank of the pin portion of the fastener, the hook member of the pin portion and the detent of the body portion acting in concert to allow the pin portion to be preassembled with the body portion of the fastener.

6. The fastener of claim 1 wherein the shank of the pin portion has a shape that cooperates with the shape of the bore formed through the head of the body portion so as to prevent relative rotation between the pin portion and body portion of the fastener.

7. The fastener of claim 1 wherein the legs of the body portion comprise a retention member on the exterior thereof that is located distal to the interference control mechanism, the retention members acting to prevent the extraction of the body portion of the fastener from the bore formed through the substrate.

8. The fastener of claim 1 wherein the slot formed between the legs of the body portion tapers from the head toward a distal end of the legs, the shank of the pin portion being constructed and arranged to engage the tapered slot and force the legs outwardly when the shank is inserted between the legs.

9. The fastener of claim 1 wherein the shank of the pin portion tapers from the head of the pin portion toward a distal end thereof, the slot formed between the legs of the body portion being constructed and arranged such that the tapered shank of the pin portion will engage the slot and force the legs outwardly when the shank is inserted between the legs.

10. A fastener for securing a panel to a substrate, the fastener comprising:

a pin portion having a head from which extends a shank;

a body portion, the body portion having a head from which extends a pair of outwardly expandable resiliently flexible legs, the legs being separated by an axially extending slot and being constructed and arranged for insertion into a bore formed in the substrate, an integrally formed flexible hinge portion connection the free end of the legs, the head itself having a bore formed therethrough, such that the bore in the head is in communication with the slot between the pair of legs, and the bore in the head and slot between the legs are arranged to receive the shank of the pin portion therein so that as the shank is forced into the slot, the pair of legs are forced away from one another and into compressive contact with an interior surface of the bore formed through the substrate so as to secure the fastener, and subsequently the panel to the substrate; and an interference control mechanism formed as part of the exterior of at least one of the legs of the body portion of the fastener adjacent a base of the at least one leg of the body portion, the interference control mechanism acting to control the compressive strength of the at least one leg so as to limit the compressive contact between the at least one leg and the interior surface of the bore formed through the substrate, thereby controlling a required insertion force that must be applied to the pin portion of the fastener to set the pin portion within the body portion of the fastener, wherein the interference control mechanism is configured and arranged to address the interior surface of the bore formed through the substrate within which the body portion of the fastener is received, and wherein the fastener further comprises a combination of at least two of the following interference control mechanisms: a bore formed through the base of at least one leg, an elastomeric member formed integral with the base of the at least one leg, and a reduced cross-sectional area formed in the base of the at least one leg.

11. The fastener of claim 1 wherein the bore formed through the base of the at least one leg has provided therein intermeshing teeth that prevent relative motion of the exterior side of the bore and the interior side of the bore.

12. The fastener of claim 10 wherein the elastomeric member comprises an elastomeric material bonded to the at least one leg, the elastomeric properties of the member reducing the effective compression strength of the at least one leg so as to lower the required insertion force that must be applied to the pin portion of the fastener to seat the pin portion within the body portion of the fastener.

13. The fastener of claim 12 wherein the at least one leg of the body portion further comprises at least one key structure that permits the elastomeric material to be mechanically bonded to the at least one leg.

14. The fastener of claim 12 wherein the elastomeric material is adhered to the at least one leg.

* * * * *